US006989541B2

(12) United States Patent
Penn

(10) Patent No.: US 6,989,541 B2
(45) Date of Patent: Jan. 24, 2006

(54) COINCIDENT NEUTRON DETECTOR FOR PROVIDING ENERGY AND DIRECTIONAL INFORMATION

(75) Inventor: David G. Penn, Arlington, VA (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 236 days.

(21) Appl. No.: 10/449,232

(22) Filed: May 30, 2003

(65) Prior Publication Data
US 2004/0238751 A1    Dec. 2, 2004

(51) Int. Cl.
G01T 3/00    (2006.01)

(52) U.S. Cl. .............................. 250/390.01; 250/390.11
(58) Field of Classification Search .......... 250/390.12, 250/390.11, 390.01
See application file for complete search history.

(56) References Cited

U.S. PATENT DOCUMENTS

| | | | |
|---|---|---|---|
| 2,854,584 A * | 9/1958 | Youmans ................ 250/390.11 |
| 3,047,720 A * | 7/1962 | Rickard ........................ 376/153 |
| 3,566,118 A * | 2/1971 | Peters ............................ 250/367 |
| 3,941,997 A | 3/1976 | Odru et al. | |
| 4,795,910 A | 1/1989 | Henderson et al. | |
| 4,804,514 A | 2/1989 | Bartko et al. | |
| 4,931,646 A | 6/1990 | Koechner | |
| 5,155,366 A | 10/1992 | Miller | |
| 5,157,261 A | 10/1992 | Grey et al. | |
| 5,231,290 A | 7/1993 | Czirr et al. | |
| 5,289,510 A | 2/1994 | Mihalczo | |
| 5,294,789 A | 3/1994 | Kruger | |
| 5,311,010 A | 5/1994 | Kruger | |
| 5,313,065 A | 5/1994 | Reed | |
| 5,323,011 A | 6/1994 | Suter et al. | |
| 5,345,084 A * | 9/1994 | Byrd ....................... 250/390.12 |
| 5,410,156 A | 4/1995 | Miller | |
| 5,434,415 A | 7/1995 | Terada et al. | |
| 5,496,997 A | 3/1996 | Pope | |
| 5,519,226 A | 5/1996 | Copeland et al. | |
| 5,600,144 A | 2/1997 | Worstell | |
| 5,665,971 A | 9/1997 | Chen et al. | |
| 5,680,423 A | 10/1997 | Perkins et al. | |
| 5,692,029 A | 11/1997 | Husseiny et al. | |
| 5,714,761 A | 2/1998 | Fay | |
| 5,734,689 A * | 3/1998 | Copeland et al. ........... 376/153 |
| 5,774,515 A | 6/1998 | Fujiwara et al. | |
| 5,783,829 A | 7/1998 | Sealock et al. | |
| 5,880,469 A | 3/1999 | Miller | |
| 5,880,475 A | 3/1999 | Oka et al. | |
| 6,100,530 A | 8/2000 | Kronenberg et al. | |
| 6,140,651 A | 10/2000 | Justus et al. | |

(Continued)

FOREIGN PATENT DOCUMENTS

GB    2253070 A    *    8/1992

(Continued)

Primary Examiner—Constantine Hannaher
(74) Attorney, Agent, or Firm—Michael J. Bell; Howrey LLP

(57) ABSTRACT

A neutron detector may include a neutron counter and a plurality of optical fibers peripherally arrayed around the counter. The optical fibers have thereon a layer of scintillator material, whereby an incident fast neutron can transfer kinetic energy to nuclei in one or more of the optical fibers to produce recoil protons. The recoil protons interact with the coating to produce scintillation light that is channeled along the optical fiber or fibers with which the neutron interacted. The slowed neutron passes into the neutron counter where the neutron effects generation of a signal coincident with the light produced in the optical fibers in which the neutron deposited energy.

29 Claims, 5 Drawing Sheets

U.S. PATENT DOCUMENTS

| | | |
|---|---|---|
| 6,151,769 A | 11/2000 | Bliss et al. |
| 6,313,465 B1 | 11/2001 | Nittoh et al. |
| 6,373,066 B1 * | 4/2002 | Penn .................... 250/390.11 |
| 6,407,392 B1 | 6/2002 | Tsuyuki et al. |
| 6,479,829 B1 | 11/2002 | Katagiri |
| 2001/0046274 A1 * | 11/2001 | Craig et al. ................. 376/154 |
| 2002/0121604 A1 | 9/2002 | Katagiri |
| 2004/0227098 A1 * | 11/2004 | Tarabine ................ 250/390.11 |

FOREIGN PATENT DOCUMENTS

| | | | |
|---|---|---|---|
| JP | 02082188 A | * | 3/1990 |
| RU | 2119178 C1 | * | 9/1998 |

* cited by examiner

COINCIDENT NEUTRON DETECTOR FOR PROVIDING ENERGY AND DIRECTIONAL INFORMATION

The invention herein described relates generally to the field of neutron detection and more particularly to a neutron detector that provides neutron energy and direction information.

BACKGROUND OF THE INVENTION

A conventional method for detecting thermal neutrons is based on detection of the effects of secondary charged particles produced when a thermal neutron is captured by a $^3$He nucleus. This reaction results in the production of a $^3$H nucleus with a kinetic energy of 190 KeV and a proton with a kinetic energy of 570 KeV. These energetic charged particles produce ionization tracks in surrounding substances. The ionization track will include ionized gas molecules (ions) which can be detected either by optical emissions or by direct collection of ions. Optical detection has an advantage over ion collection of more rapid response time and insensitivity to noise caused by vibration.

A continuing need exists for the development of improved neutron detection systems capable of offering (a) better collection efficiency than standard $^3$He tubes, (b) better ruggedness and/or compactness for portability applications, and/or (c) the determination of both the energy of the neutron and the direction of travel. Various attempts to achieve one or more of these and other goals are described in the below-summarized patents.

U.S. Pat. No. 5,155,366 discloses an apparatus and method for detecting a particular type of particle (e.g. neutrons) in an energy range of interest. The apparatus includes two PMTs which are spaced apart in facing relation to one another. A scintillator, positioned between the PMTs, comprises an array of optical fibers arranged substantially contiguously side-by-side. Each of the fibers has a first end proximate the one PMT and an opposing end proximate the other PMT. Also, each fiber has one of its ends being non-transmissive of light, and the fibers are arranged so that contiguous ones do not have their same ends being non-transmissive of light. Each of the fibers has a cross sectional dimension chosen in relation to a distance that the particular type of particle in the energy range of interest can travel. A signal processor unit discriminates between different types of particles and rays by determining the number of fibers affected within a predetermined time interval by an incoming particle or ray.

U.S. Pat. No. 5,231,290 discloses a neutron detector that relies upon optical separation of different scintillators to measure the total energy and/or number of neutrons from a neutron source. In a pulse mode embodiment, neutrons are detected in a first detector which surrounds a neutron source and in a second detector surrounding the first detector. An electronic circuit insures that only events are measured which correspond to neutrons first detected in the first detector followed by subsequent detection in the second detector. In a spectrometer embodiment, neutrons are thermalized in the second detector which is formed by a scintillator-moderator and neutron energy is measured from the summed signals from the first and second detectors. No directional information is provided.

U.S. Pat. No. 5,410,156 (RE36,201) discloses a fast neutron x-y detector and radiographic/tomographic device utilizing a white neutron probe. The detector detects fast neutrons over a two dimensional plane, measures the energy of the neutrons, and discriminates against gamma rays. The detector face is constructed by stacking separate bundles of scintillating fiber optic strands one on top of the other. The first x-y coordinate is determined by which bundle the neutron strikes. The other x-y coordinate is calculated by measuring the difference in time of flight for the scintillation photon to travel to the opposite ends of the fiber optic strand 20. Neutron energy is calculated by measuring the flight time of a neutron from a point source to the detector face.

U.S. Pat. No. 5,289,510 discloses a nuclear reaction detector with optical fibers arranged in side-by-side relationship in X and Y directions with a layer of nuclear reactive material operatively associated with surface regions of the optical fiber arrays. This arrangement provides position sensitivity with submillimeter resolution in two dimensions.

U.S. Pat. No. 5,880,469 discloses an apparatus and method for discriminating against neutrons coming from a direction other than a preferred direction and for discriminating against gamma rays. The apparatus includes two photomultiplier tubes that are parallel to each other and are attached to one end of a light pipe. A neutron scintillator is attached to the other end of the light pipe. The scintillator is comprised of optical fibers arranged contiguously along a first direction, which is perpendicular to a length dimension of the optical fibers, and which optical fibers alternate between optical fibers which emit photons only in the lower portion of the electromagnetic spectrum and optical fibers which emit photons only in the higher portion of the electromagnetic spectrum. Two filters are provided between the PM tubes and the light pipe, one filter transmitting only photons in the lower end of the electromagnetic spectrum and the other filter transmitting only photons in the higher portion of the electromagnetic spectrum.

U.S. Pat. No. 5,519,226 discloses an apparatus for detection of thermal neutrons including a volume of gas which includes $^3$He. A wavelength shifting optical (WSO) fiber is disposed to receive ultra-violet photons generated by reactions between neutrons and $^3$He. UV photons are absorbed within the WSO fiber to produce longer wavelength fluorescence generated photons that propagate within the WSO fiber. A photodetector is disposed to receive fluorescence generated photons from at least one end of the optical fiber and provide an output signal corresponding to neutron detection.

SUMMARY OF THE INVENTION

The present invention provides a neutron detection system and method that is capable of offering (a) better collection efficiency than standard $^3$He tubes, (b) better ruggedness and/or compactness for portability applications, and/or (c) the determination of both the energy of the neutron and the direction of travel. More particularly, the present invention provides a compact detector configuration that provides both neutron energy and directional information. Still more particularly, the present invention provides a compact detector characterized by a $^3$He proportional counter surrounded by optical fibers (preferably plastic optical fibers) that are coated with a scintillator material (preferably an activated zinc sulfide scintillator material).

Accordingly, a neutron detector comprises a neutron counter, and a plurality of optical fibers peripherally arrayed around the counter. The optical fibers have thereon a layer of scintillator material, whereby an incident fast neutron can transfer kinetic energy to nuclei in one or more of the optical fibers to produce recoil protons. The recoil protons interact with the coating to produce scintillation light that is channeled along the optical fiber or fibers with which the neutron interacted. The slowed neutron passes into the neutron counter where the neutron effects generation of a signal coincident with the light produced in the optical fibers in which the neutron deposited energy.

In accordance with one aspect of the invention, a neutron detector element comprises a neutron counter having an axis, a plurality of optical fibers extending along the axis of the neutron counter and peripherally arrayed around the neutron counter, and a scintillator material surrounding and optically coupled to the optical fibers.

In a preferred embodiment, the optical fibers have hydrogen nuclei for interaction with incident fast neutrons and more preferably the optical fibers are plastic optical fibers. The scintillator material can be provided on each optical fiber as an individual layer, for example as a coating, and the scintillator material can be an activated zinc sulfide scintillator material.

In a preferred embodiment, the neutron counter is a $^3$He proportional counter that is cylindrical, and the optical fibers are bundled in a cylindrical array around and contiguous with the cylindrical neutron counter. The bundle of optical fibers can completely surround and cover an outer cylindrical surface of the cylindrical neutron counter, and the optical fibers preferably extend parallel to the axis of the cylindrical neutron counter.

According to another aspect of the invention, there is provided a neutron detector comprising the foregoing neutron detector element, and first and second photodetectors optically coupled to the optical fibers at respective opposite ends of the optical fibers for receiving photons and generating representative output signals.

In a preferred embodiment, the first photodetector is a position determining photodetector to which the adjacent end of each fiber is optically coupled to a specific location on an end face of the positioning determining photodetector at a location corresponding to its location relative to the neutron counter. The position determining photodetector can be a position sensitive photomultiplier tube.

According to a further aspect of the invention, a neutron detector system comprises the foregoing neutron detector, and a signal processor for processing signals generated by the neutron counter and first and second photodetectors.

In a preferred embodiment, the signal processor provides two positional signals based on output signals of the first photodetector and a third positional signal based on output signals of the first and second photodetectors. The signal processor can output a neutron energy signal based on output signals of the first and second photodetectors, and only coincident signals from the first and second photodetectors and the neutron counter are analyzed for position information.

According to yet another aspect of the invention, a neutron detector comprises a cylindrical neutron counter having an axis; a plurality of plastic optical fibers having hydrogen nuclei for interaction with incident fast neutrons, the optical fibers extending parallel to the axis of the neutron counter and bundled in a cylindrical array around and contiguous with the cylindrical neutron counter, with each optical fiber having an individual coating of scintillator material; and first and second photodetectors optically coupled to the optical fibers at respective opposite ends of the optical fibers for receiving photons and generating representative output signals, said first photodetector being a position determining photodetector to which the adjacent end of each fiber is optically coupled to a specific location on an end face of the position determining photodetector at a location corresponding to its location relative to the neutron counter.

The invention also provides a method for detecting fast neutrons, comprising the steps of (a) positioning, at a location to be monitored for fast neutrons, a neutron detector element including a neutron counter, a plurality of optical fibers peripherally arrayed around the counter, and a scintillator material surrounding and optically coupled to the optical fibers, such that an incident fast neutron can transfer kinetic energy to nuclei in one or more of the optical fibers to produce recoil protons, the recoil protons can interact with the scintillator material to produce scintillation light that is channeled along the optical fiber or fibers with which the neutron interacted, and the slowed neutron can pass into the neutron counter where the neutron effects generation of a signal coincident with the light produced in the optical fibers in which the neutron deposited energy; (b) using a position determining photodetector at one end of the optical fibers and to which each fiber is optically coupled to a specific location on an end face of the positioning determining photodetector at a location corresponding to its location relative to the neutron counter, to provide two positional signals; (c) using another photodetector at an opposite end of the optical fibers and to which each fiber is optically coupled, to provide in conjunction with the position determining photodetector a third positional signal; and (d) analyzing for position and energy information only coincident signals from the first and second photodetectors and the neutron counter.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
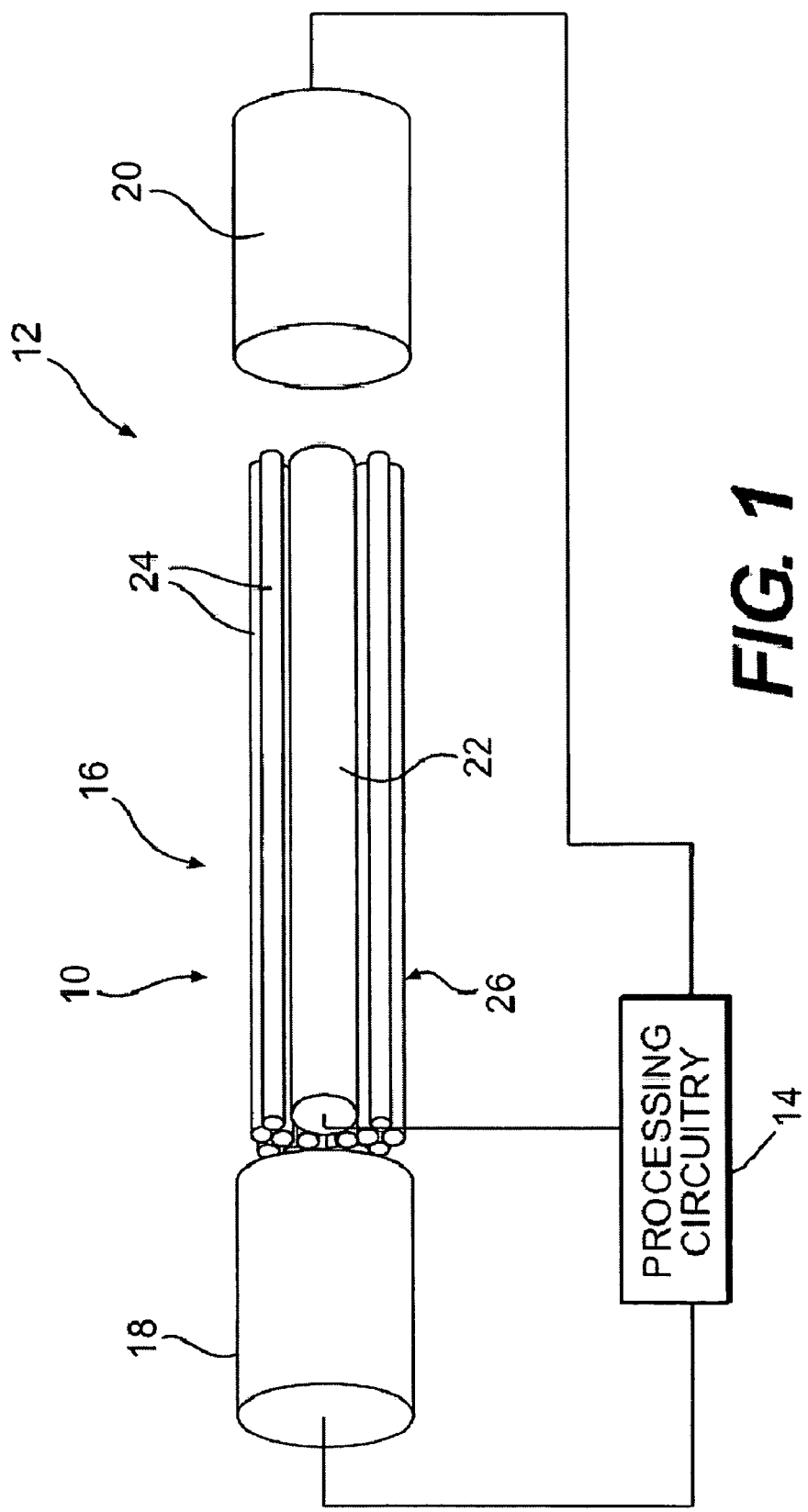
FIG. 1 is a partly diagrammatic illustration of a neutron detector system according to the invention, which includes a detector that is shown in exploded perspective view with some of the optical fibers thereof removed for illustration purposes.

Referring now in detail to the drawings and initially to FIG. 1, an exemplary neutron detector according to the invention is generally designated by reference numeral 10. The detector is shown as part of a detector system 12 including the detector 10 and processing circuitry 14 for processing the signals generated by the detector to provide the energy and/or the direction of incident neutrons.

The detector 10 comprises a neutron detector element 16 and a pair of photodetectors 18 and 20 optically coupled to respective opposite ends of the detector element. The neutron detector element 16 comprises a neutron counter 22 and a plurality of optical fibers 24 peripherally arrayed around the counter 22. As shown, the neutron counter 22 can be a rugged $^3$He proportional counter including a cylindrical enclosure containing a gaseous mixture including $^3$He. As is well known, the absorption of a thermal neutron in the nucleus of $^3$He causes the prompt emission of a proton. The proton causes ionization in the gas to which a high voltage is applied, and this causes an electrical pulse to be produced. It is conceivable that other types of neutron counters can be used in the practice of the present invention.

The optical fibers 24 are bundled in a cylindrical array around and contiguous with the cylindrical enclosure of the neutron detector 22. Preferably, the optical fibers extend parallel to the axis of the cylindrical enclosure and are disposed in one or more rings concentric with the cylindrical enclosure. Ideally, the bundle 26 of optical fibers completely surrounds and covers the outer cylindrical surface of the neutron detector. In FIG. 1, the optical fibers nearest the viewer have been removed to better show the relationship between the optical fibers and the neutron counter.

The optical fibers 24 preferably are plastic optical fibers that contain hydrogen nuclei for interaction with incident neutrons, although it is conceivable that other types of optical fibers can be used in the practice of the invention, which other types interact with incident fast neutrons to produce recoil protons.

Figure 2:
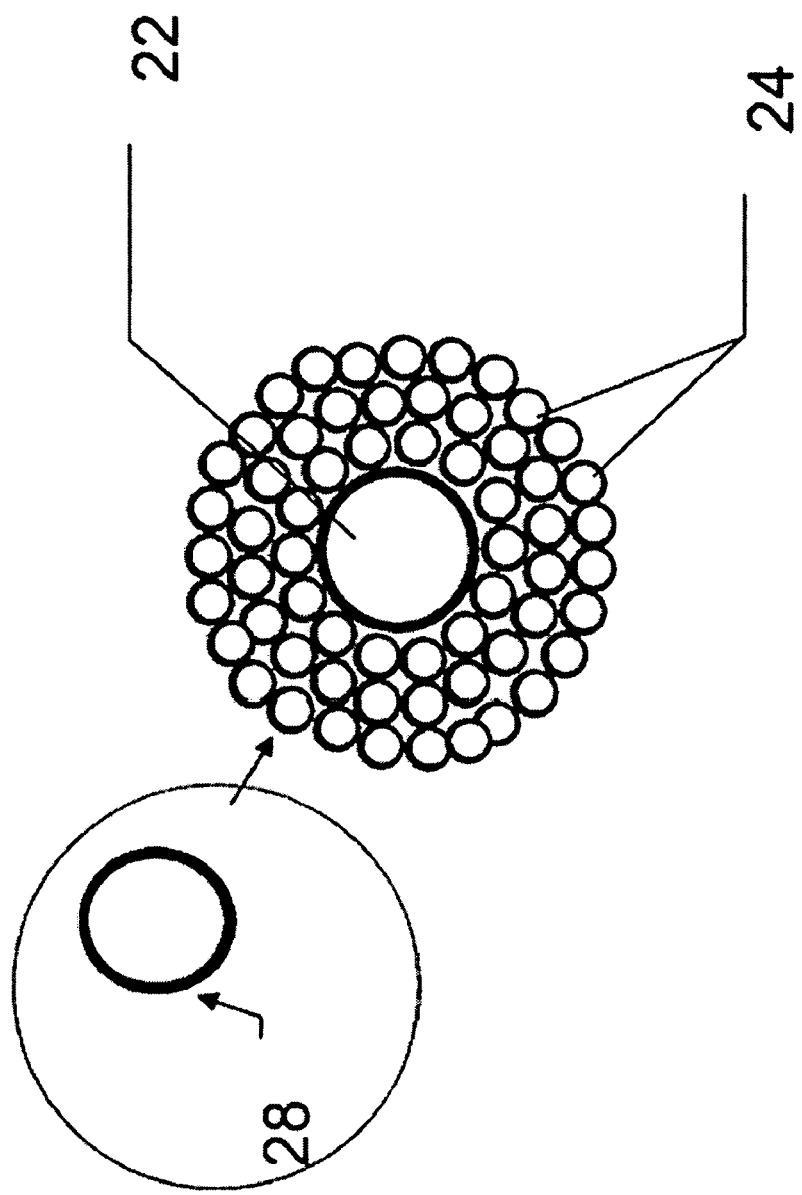
FIG. 2 is a cross-sectional view of the detector of FIG. 1, taken along the line 2—2 of FIG. 1.

In addition, each optical fiber 24 has formed thereon a layer of scintillation material 28, as depicted in FIG. 2. Preferably, the layer is formed by coating each optical fiber with a scintillation material and particularly a silver-activated zinc sulfide scintillator. The thickness of the layer preferably is no greater than 5 mm, more preferably no greater than about 0.5 mm, and most preferably is about 0.1 mm. The fibers preferably have a diameter in the range of 0.1–3 mm and more preferably in the range of 0.1–1 mm. While individual coatings for the fibers is preferred, the fibers could be embedded in one or more blocks of scintillator material common to several or all of the fibers, such as a single tubular block of scintillator material.

Each optical fiber 24 has opposite ends thereof respectively optically coupled to the photodetectors 18 and 20 located at opposite ends of the bundle of fibers and consequently at opposite ends of the neutron counter. The photodetector 18 can be a standard photodetector such as a standard photomultiplier tube (PMT), whereas the photodetector 20 preferably is a position determining photodetector, such as a position sensitive PMT. The end of each fiber is optically coupled to a specific location on the end face of the position sensitive PMT at a location corresponding to its location in the bundle and thus its position relative to the $^3$He proportional counter.

An exemplary position sensitive PMT 20, such as an Hamamatsu R2486 PMT, has a wire mesh anode which provides four signal outputs: two for determining the x location and two for determining the y location. The charge produced from an electron cascade in the position sensitive PMT is distributed among the four signal outputs proportionally with respect to the incident light location. A similar proportionality exists for the z-axis, but this is generated by extracting a signal from the dynode nearest the anode on the position sensitive PMT 20 and comparing it with the signal from the standard PMT 18 at the opposite end of the fiber bundle.

Figure 3:
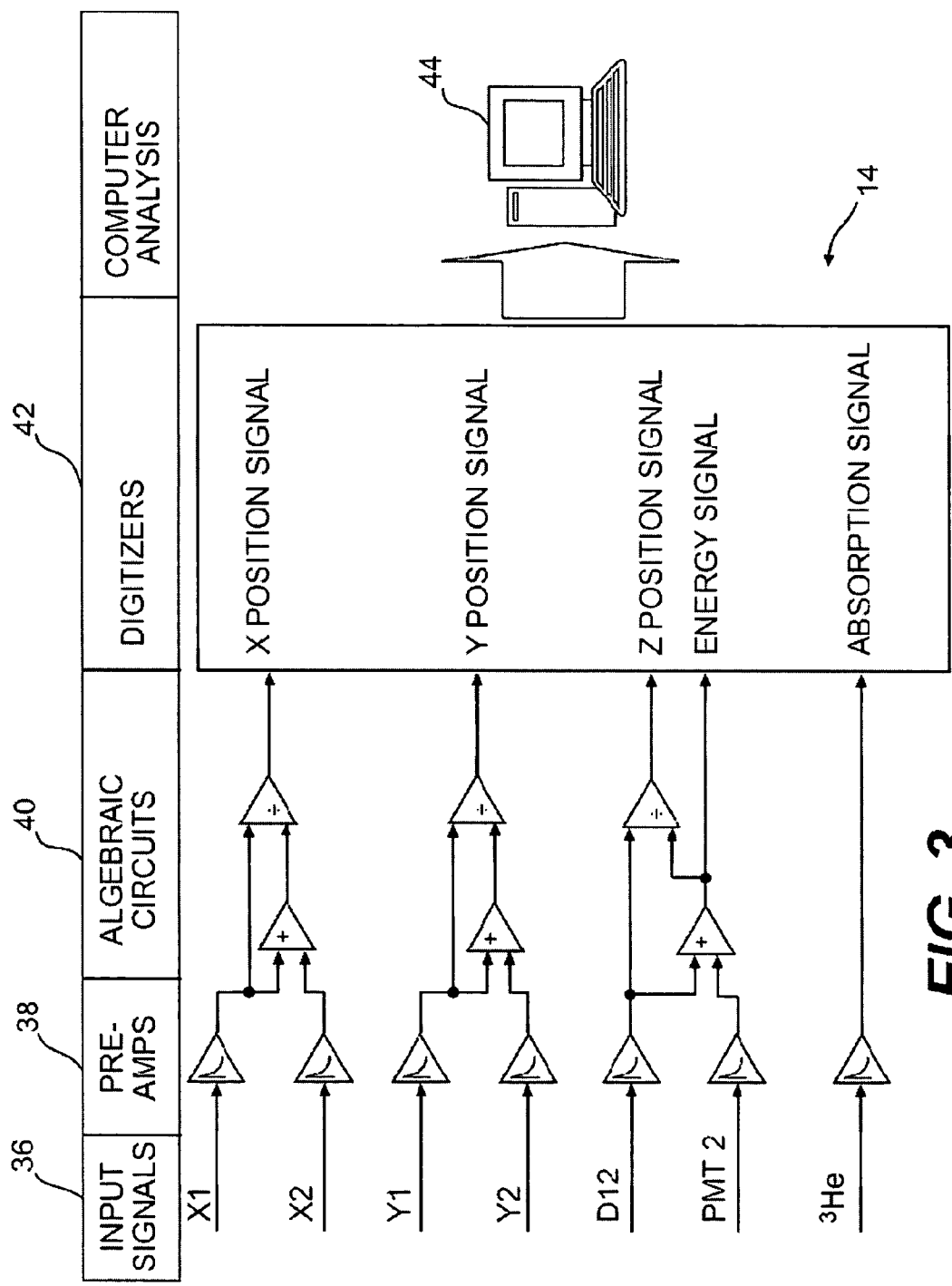
FIG. 3 is schematic illustration of processing circuitry employed in the detector system of FIG. 1.

The signal outputs of the PMTs 18 and 20 are supplied to the processing circuitry 14. Exemplary processing circuitry is schematically shown in FIG. 3. The input signals 36 from both PMTs 18 and 20 and the neutron counter 22 can be conditioned with charge sensitive pre-amplifiers 38 and then processed by algebraic circuits 40 and digitizers 42 for analysis by a computer 44. As illustrated, there is provided an x-axis position signal, a y-axis position signal, a z-axis position signal, an energy signal and an absorption signal. Although an orthogonal coordinate system is specifically described, it will be appreciated that other coordinate systems can be used if desired.

An exemplary data acquisition system can be composed of high speed digitizers, e.g. 2.5 GS/s, installed in a personal computer (PC). The signals from the PMTs and proportional counter can be conditioned by charge sensitive pre-amplifiers, discriminator circuits, and arithmetic circuits. Following conditioning, the signals can be routed to digitizers for storage. The digitizers can be configured similar to an oscilloscope with a leading edge trigger that will record the signal once it passes a threshold voltage. Each digitizer will also place a time stamp on each sample providing, for example, better than 1 ns timing resolution. The digitizers can each have 32 megabytes of on-board memory, and can be capable of streaming data to the PC for uninterrupted operation. Once the signals have been digitized and transferred to the PC, the remainder of the signal processing and data display can be performed by software.

In operation of the above-described neutron detector system 12, incident fast neutrons (>100 keV) emitted by a source will collide with hydrogen nuclei in the plastic fiber bundle annulus 26 surrounding the $^3$He proportional counter 22. Upon collision, the neutrons will transfer kinetic energy to hydrogen nuclei, creating recoil protons. The recoiling protons, being a massive charged particles, are detected by the scintillator material on the surface of the plastic fibers. The fibers channel the scintillation light to the position sensitive PMT 20 and the output signals of the PMT 20 can be analyzed to indicate the fiber or fibers in which an incident neutrons deposited energy. The neutrons, having imparted energy to the plastic fibers, may be moderated to thermal energies and enter the proportional counter where they have a high probability of being absorbed by the $^3$He gas. If within a certain time window there are events detected in both the fiber bundle and the $^3$He tube, this would be considered a coincidence detection. If the signals for a coincidence detection produced by the recoil protons are summed, they will be proportional to the total incident neutron energy. That is, when a coincidence is detected, the signals from the PMTs 18 and 20 can be summed to provide an output that is proportional to the kinetic energy of the incident neutron.

Directional information can also be obtained. The optical fibers 24 and position sensitive PMT 20 provide the ability to indicate the approximate location of the recoiling protons. That is, when neutrons enter the fiber bundle and scatter off of the hydrogen nuclei creating recoil protons, the protons travel a very short distance and interact in the ZnS(Ag) coating. The scintillation light produced is then directed to both the position sensitive PMT 20 and the standard PMT 18 through the individual fibers. Since optical fibers are used, in contrast to a scintillator block, there will be little light spreading and very little cross talk between adjacent fibers.

The position coordinates are calculated by determining the centroid from the individual axis signal pairs. Therefore, if there were a recoiling proton produced in a fiber 24 and the fiber guides the scintillation light onto the position sensitive PMT 20, there will be a charge pulse signal produced on all six signal cables. The x location can be calculated by dividing one of the x signals by the sum of the two x signals. The y and z locations can be determined by an identical method with their respective signal pairs.

A signal produced in the proportional counter 22 in coincidence with a photomultiplier tube signal is an indication that the neutron entered the detector, lost the majority of its kinetic energy, and was absorbed. When a coincidence is detected, the signals from the PMTs 18 and 20 can be summed to provide an output that is proportional to the kinetic energy of the incident neutron. An advantage of the scintillator clad fibers 24 is that the activated zinc sulfide provides an inherent ability to discriminate neutron interactions from gamma-ray interactions. The neutron interactions produce heavy charged particles that produce a proportionally greater amount of light in the scintillator than the light that the gamma-ray induced fast electrons produce.

Figure 4:
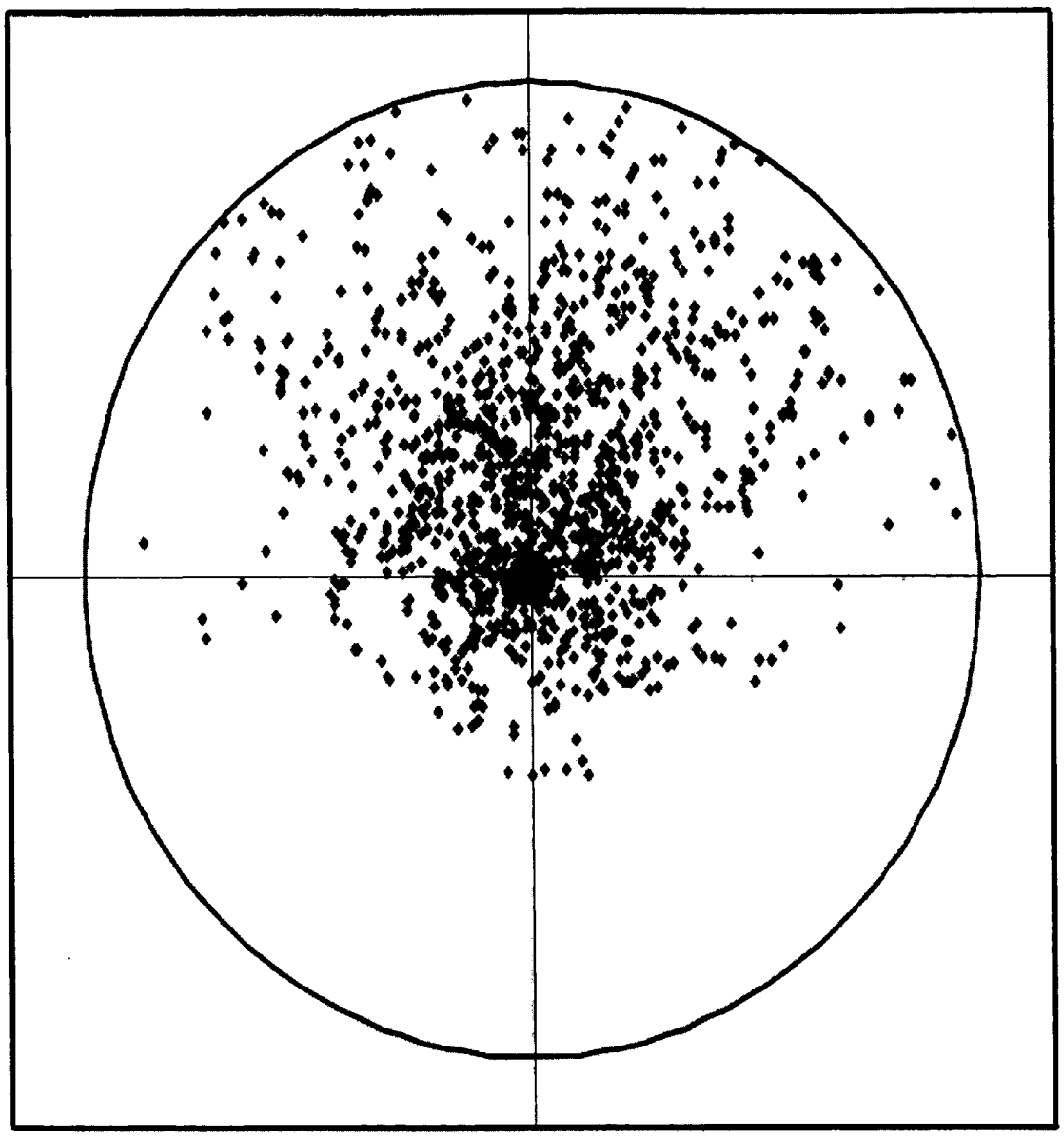
FIG. 4 illustrates neutron scatter locations with a coincident absorption in the proportional counter.
Figures 5, 6:
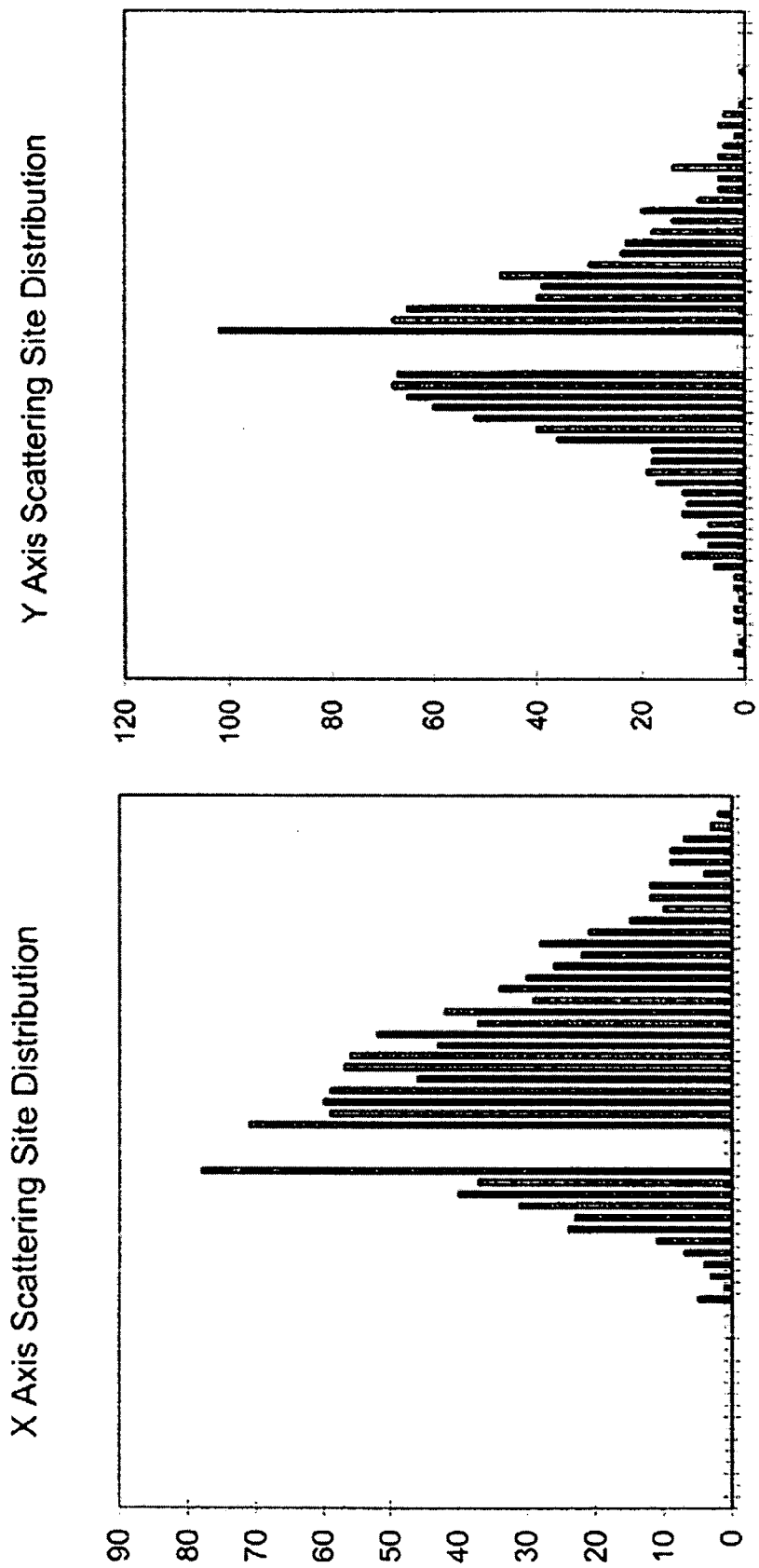
FIGS. 5 and 6 are histograms showing Neutron scatter sites along the X and Y axes.

When the neutron source is very close to the detector, such as within about 1 foot, the methodology, as thus far described, alone will work well to determine the source direction. When the source is far away, such as greater than 10 feet, the solid angle to the detector is small and the neutron scattering locations are distributed homogeneously throughout the plastic, which appears to make determining the source position difficult or impossible without a collimator. While a collimator could be employed, the problem can be overcome by examining the coincident events between the scintillator and proportional counter. If only coincident events between the fiber bundle and proportional counter are analyzed for position information, then the system will be primarily examining forward scattering events. This provides the required directional information without the use of a collimator. FIG. 4 illustrates the neutron interaction sites where greater than 100 keV of energy was deposited via scattering and are coincident with an absorption in the proportional counter. FIGS. 5 and 6 are histograms of the neutron scatter sites along the x and y axis. FIGS. 4-6 were generated using a Monte Carlo simulation where a spontaneous fission spectrum from $^{252}$Ca was simulated and emitted isotropically from a position 2 meters away along the positive x axis at mid height.

The aforedescribed method of neutron coincidence spectroscopy offers distinct advantages over prior methods. For example, the use of coated fibers affords the ability to obtain directional information about incident neutrons. Another advantage is improved gamma-ray rejection relative to earlier neutron coincidence systems that used blocks of scintillating plastic or a liquid scintillator to detect recoil protons.

The inherent gamma-ray rejection is due to the fact that the amount of scintillation light produced in ZnS(Ag) by heavy charged particles is greater than that for fast moving electrons of the same energy. Therefore, since the thickness of ZnS(Ag) preferably is minimal, the probability of gamma rays interacting in the scintillator is quite small. The combination of coating thickness and the fact that the amount of light produced by gamma rays in the scintillator is less than the amount produced by heavy charged particles makes the system inherently insensitive to gamma rays.

The applications of above-described detector system 12 are broad and include: detection of nuclear contraband at ports of entry; on-site inspections; identification of shielding problems at nuclear reactors; and identification of neutron streaming at high energy physics laboratories.

The detector system 12 essentially is functional for any application where knowing the neutron energy spectrum or source direction is useful. The foreseeable end users of the herein described system and method will likely be associated with national laboratories, defense threat reduction personnel, and universities. The present invention provides an instrument capable of measuring neutron energies over a broad spectral range with the added value of source direction determination.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

What is claimed is:

1. A neutron detector element comprising a neutron counter having an axis, a plurality of optical fibers extending along the axis of the neutron counter and peripherally arrayed around the neutron counter, and a scintillator material surrounding and optically coupled to the optical fibers.

2. A neutron detector element as set forth in claim 1, wherein the optical fibers have hydrogen nuclei for interaction with incident fast neutrons.

3. A neutron detector element as set forth in claim 1, wherein the optical fibers are plastic optical fibers having hydrogen nuclei for interaction with incident fast neutrons.

4. A neutron detector element as set forth in claim 1, wherein the scintillator material is provided on each optical fiber as an individual layer.

5. A neutron detector element as set forth in claim 4, wherein the layer has a thickness no greater than about 5 mm.

6. A neutron detector element as set forth in claim 1, wherein each optical fiber has an individual layer of the scintillator material coated thereon.

7. A neutron detector element as set forth in claim 1, wherein the scintillator material is an activated zinc sulfide scintillator material.

8. A neutron detector element as set forth in claim 1, wherein the neutron counter is a $^3$He proportional counter.

9. A neutron detector element as set forth in claim 1, wherein the neutron counter is cylindrical, and the optical fibers are bundled in a cylindrical array around and contiguous with the cylindrical neutron counter.

10. A neutron detector element as set forth in claim 9, wherein the bundle of optical fibers completely surrounds and covers an outer cylindrical surface of the cylindrical neutron counter.

11. A neutron detector element as set forth in claim 9, wherein the optical fibers extend parallel to the axis of the cylindrical neutron counter.

12. A neutron detector element as set forth in claim 9, wherein optical fibers are arranged in one or more rings concentric with the cylindrical enclosure.

13. A neutron detector comprising the neutron detector element of claim 1, and first and second photodetectors optically coupled to the optical fibers at respective opposite ends of the optical fibers for receiving photons and generating representative output signals.

14. A neutron detector as set forth in claim 13, wherein said first photodetector is a position determining photodetector to which the adjacent end of each fiber is optically coupled to a specific location on an end face of the positioning determining photodetector at a location corresponding to its location relative to the neutron counter.

15. A neutron detector as set forth in claim 14, wherein said position determining photodetector is a position sensitive photomultiplier tube.

16. A neutron detector system comprising a neutron detector as set forth in claim 14, and a signal processor for processing signals generated by the neutron counter and first and second photodetectors.

17. A neutron detector system as set forth in claim 16, wherein the signal processor provides two positional signals based on output signals of the first photodetector and a third positional signal based on output signals of the first and second photodetectors.

18. A neutron detector system as set forth in claim 17, wherein the signal processor outputs a neutron energy signal based on output signals of the first and second photodetectors.

19. A neutron detector system as set forth in claim 18, wherein only coincident signals from the first and second photodetectors and the neutron counter are analyzed for position information.

20. A neutron detector comprising:
a cylindrical neutron counter having an axis;
a plurality of plastic optical fibers having hydrogen nuclei for interaction with incident fast neutrons, the optical fibers extending parallel to the axis of the neutron counter and bundled in a cylindrical array around and contiguous with the cylindrical neutron counter, with each optical fiber having an individual coating of scintillator material; and
first and second photodetectors optically coupled to the optical fibers at respective opposite ends of the optical fibers for receiving photons and generating representative output signals, said first photodetector being a position determining photodetector to which the adjacent end of each fiber is optically coupled to a specific location on an end face of the position determining photodetector at a location corresponding to its location relative to the neutron counter.

21. A neutron detector element as set forth in claim 20, wherein the layer has a thickness no greater than about 5 mm.

22. A neutron detector element as set forth in claim 20, wherein the scintillator material is an activated zinc sulfide scintillator material.

23. A neutron detector element as set forth in claim 20, wherein the neutron counter is a $^3$He proportional counter.

24. A neutron detector element as set forth in claim 20, wherein said position determining photodetector is a position sensitive photomultiplier tube.

25. A neutron detector system comprising a neutron detector as set forth in claim 24, and a signal processor for processing signals generated by the neutron counter and first and second photodetectors.

26. A neutron detector system as set forth in claim 25, wherein the signal processor provides two positional signals based on output signals of the first photodetector and a third positional signal based on output signals of the first and second photodetectors.

27. A neutron detector system as set forth in claim 26, wherein the signal processor outputs a neutron energy signal based on output signals of the first and second photodetectors.

28. A neutron detector system as set forth in claim 27, wherein only coincident signals from the first and second photodetectors and the neutron counter are analyzed for position information.

29. A method for detecting fast neutrons, comprising the steps of:
Positioning, at a location to be monitored for fast neutrons, a neutron detector element including a neutron counter, a plurality of optical fibers peripherally arrayed around the counter, and a scintillator material surrounding and optically coupled to the optical fibers, such that an incident fast neutron can transfer kinetic energy to nuclei in one or more of the optical fibers to produce recoil protons, the recoil protons can interact with the scintillator material to produce scintillation light that is channeled along the optical fiber or fibers with which the neutron interacted, and the slowed neutron can pass into the neutron counter where the neutron effects generation of a signal coincident with the light produced in the optical fibers in which the neutron deposited energy;
using a position determining photodetector at one end of the optical fibers and to which each fiber is optically coupled to a specific location on an end face of the positioning determining photodetector at a location corresponding to its location relative to the neutron counter, to provide two positional signals;
using another photodetector at an opposite end of the optical fibers and to which each fiber is optically coupled, to provide in conjunction with the position determining photodetector a third positional signal; and
analyzing for position and energy information only coincident signals from the first and second photodetectors and the neutron counter.

* * * * *